UNITED STATES PATENT OFFICE.

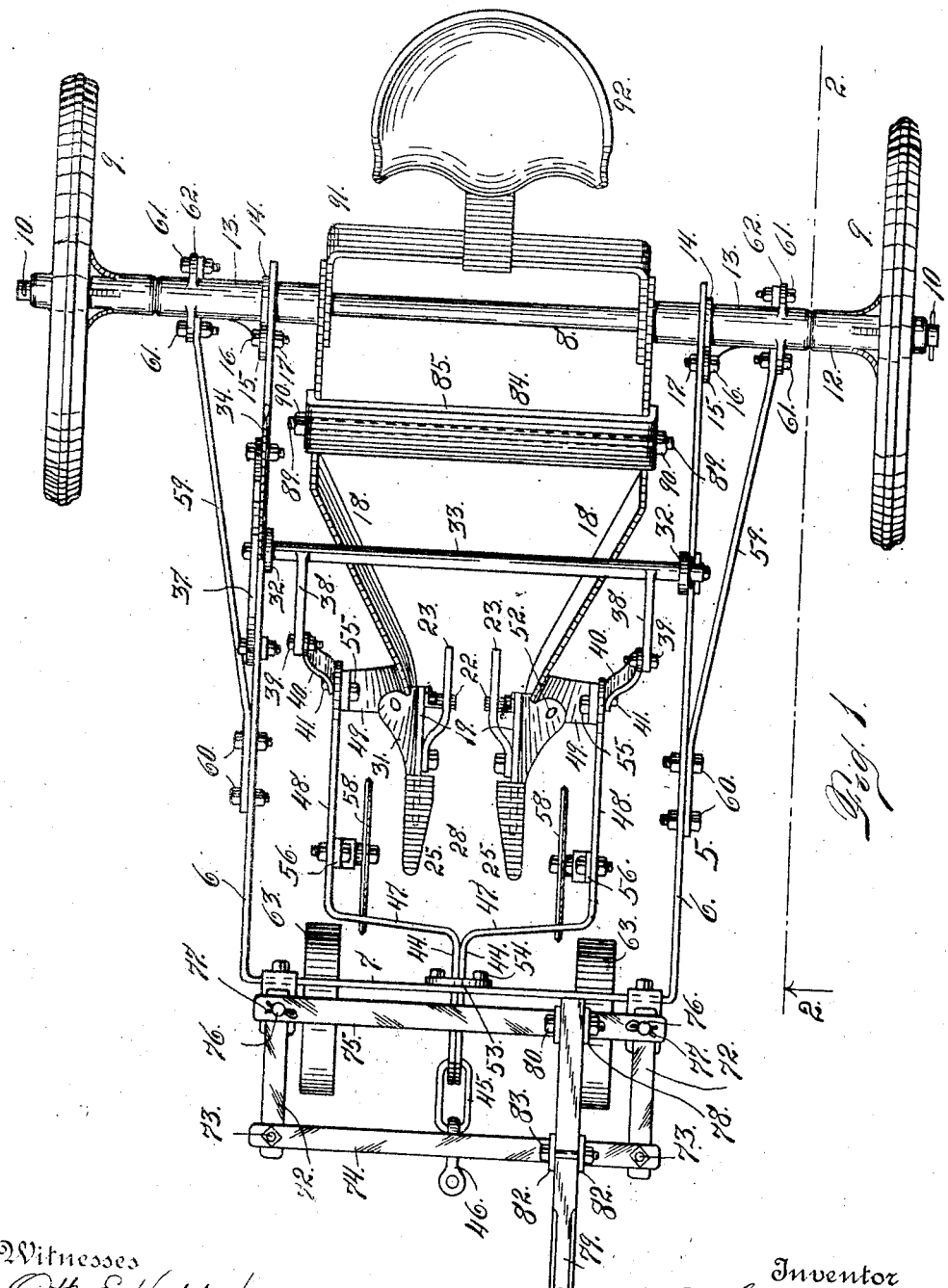

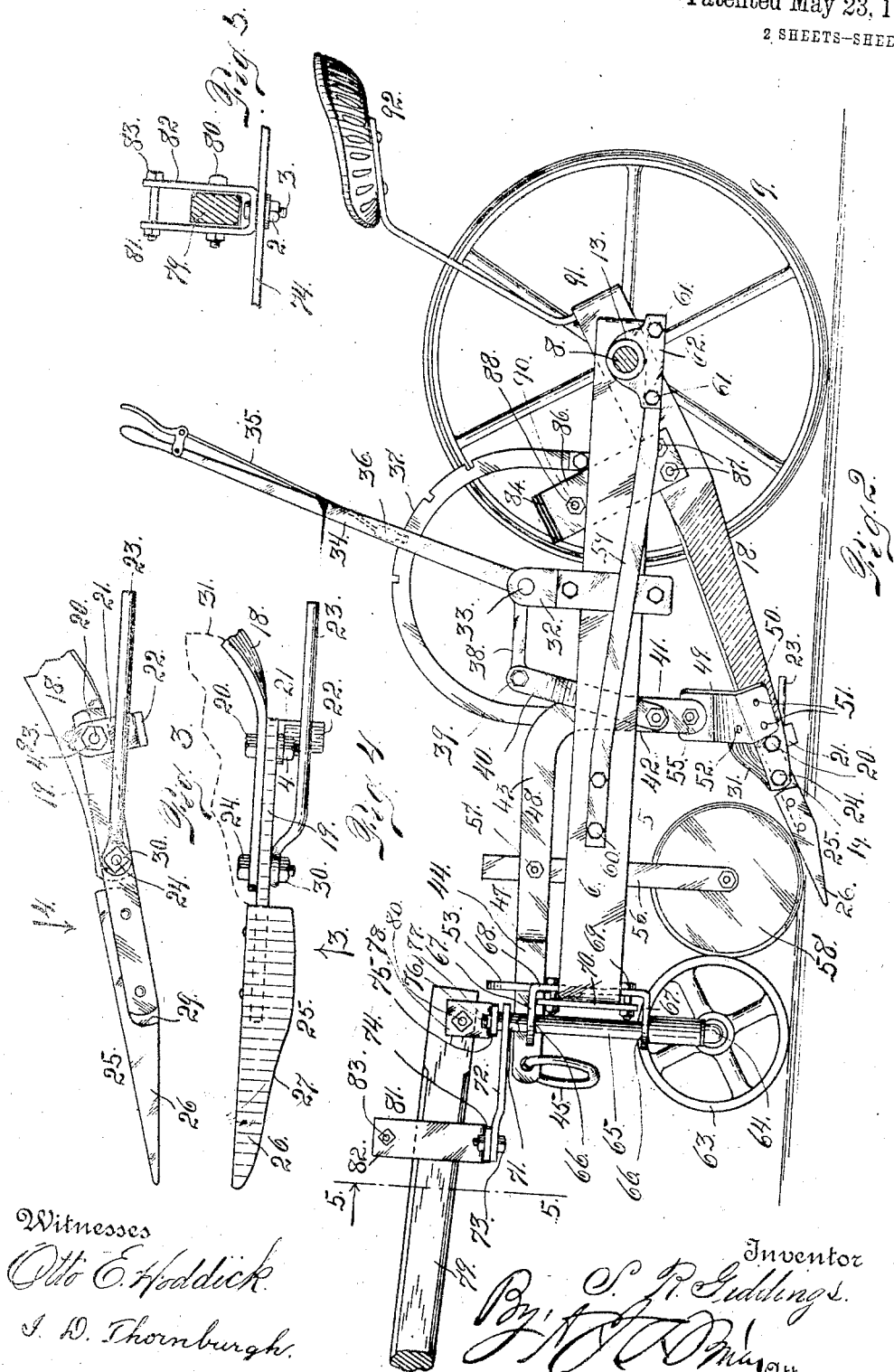

SQUIRE R. GIDDINGS, OF TIMNATH, COLORADO.

BEET-PULLER.

992,955.

Specification of Letters Patent. Patented May 23, 1911.

Application filed November 9, 1908. Serial No. 461,835.

*To all whom it may concern:*

Be it known that I, SQUIRE R. GIDDINGS, a citizen of the United States, residing at Timnath, county of Larimer, and State of Colorado, have invented certain new and useful Improvements in Beet-Pullers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in vegetable pullers, being more especially adapted for pulling sugar beets. It is evident, however, that it may be employed for pulling vegetables of any kind that are grown in rows.

My improved construction includes a suitable frame-work mounted upon ground wheels and carrying two plows adapted to enter the ground on opposite sides of the beets, the said plows being downwardly inclined and arranged to grasp the beets on opposite sides as the machine is drawn over the field. The inner faces of these plows are inclined, whereby the space between them for the reception of the beets, is wedge-shaped. As the machine moves along, the plows grasp the beets on opposite sides and lift them out of the earth, causing them to travel rearwardly and drop downwardly in a row. Provision is made for raising the plows or pullers out of the earth or to cause them to pass more or less deeply thereinto, as may be desired or as circumstances may require.

Having briefly outlined my improved construction, I will proceed to describe the same in detail, reference being made to the accompanying drawing in which is illustrated an embodiment thereof.

In this drawing, Figure 1 is a top plan view of my improved vegetable puller. Fig. 2 is a side elevation of the same, except the rear axle which is shown in section, one of the ground wheels being removed. This is a view looking in the direction of arrow 2 Fig. 1, the axle being sectionized on the line 2—2 of the same figure. Fig. 3 is a side elevation of one of the plows or pullers. This is a view looking in the direction of arrow 3 Fig. 4. Fig. 4 is a top plan view of the same, or a view looking in the direction of arrow 4 Fig. 3. Fig. 5 is a section taken on the line 5—5 Fig. 2 viewed in the direction of the arrow.

The same reference characters indicate the same parts in all the views.

Let the numeral 5 designate a frame composed of an integral bar of metal and consisting of parallel side members 6 and a front transverse member 7. The rear extremities of the members 6 are mounted upon the rear axle 8 upon whose outer extremities are journaled ground wheels 9 held in place upon the axle by cotter pins 10. These wheels are provided on one side with relatively long hub members 12. If it is desired the wheels may be brought closer together by reversing them, whereby the hub members 12 extend outwardly instead of inwardly from the wheel bodies. This is an important feature since the distance between rows of vegetables, as beets, varies. When used with beets whose rows are the minimum distance apart, the position of the wheels is such that the hub members 12 project outwardly; while when used with rows of beets that are farther apart, the position of the wheels is reversed, as illustrated in Fig. 1 of the drawing.

Extending inwardly upon the axle from the hub members 12 (see Fig. 1), are sleeves 13 provided with collars 14 which engage the frame members 6 on the outside. Each collar 14 has a forward extension 15 provided with an opening registering with an opening in the adjacent frame member. Bolts 16 are passed through these openings and secured by nuts 17 on the opposite side. The inner extremity of each sleeve 13 engages the rear extremities of bars 18. The rear ends of these bars are mounted upon the axle 8, while to their lower and forward extremities are secured metal straps 19 by bolts 20. Each bolt 20 passes through the upper extremity of an angle clip 21 whose lower extremity is bent inwardly as shown at 22 to form a support for a finger 23 whose forward extremity is secured to the bar 18 by a bolt 24. Extending forwardly from the forward extremity of each bar 18 is a puller plow 25 which is tapered on its lower side as shown at 26, and on its inner surface as shown at 27. These two plows are separated by a suitable space 28. Each plow is recessed on its inner surface as shown at 29 whereby the forward end of the metal strap is overlapped by the plow as indicated in Fig. 4, the dotted lines indicating the forward end of the strap.

Each finger 23 is adjustable vertically by loosening a nut 30 upon the bolt 24. The beets after they are pulled, travel upwardly over these fingers as they leave the plows and drop downwardly as heretofore explained.

By virtue of the vertical adjustment of the fingers, this upward travel may be of greater or less degree as required, or as circumstances may require.

The clip 21 forms an additional support for each finger intermediate its extremities. This clip is also adjustable by turning it upon its bolt 20. It is evident that if the lower extremity of the clip in swung forwardly, it will allow the finger to drop further downwardly and vice versa.

The upwardly extending and outwardly flared portion 31 has its lower edge secured to the rear portion of each metal strap 19, by means of the bolts 20 and 24.

The side members 6 of the frame are respectively provided with upwardly projecting parts 32 in which the extremities of a rock shaft 33 are journaled. Fast upon this shaft is the lower extremity of a hand lever 34 having an adjustable rod 35 provided at its lower extremity with a pawl 36 coöperating with a notched quadrant 37. The rock shaft is provided with forwardly extending crank arms 38 whose forward extremities are connected by bolts 39 with the upper extremities of links 40, the lower extremities of the latter being pivotally connected as at 41 with the lower portions of the downwardly turned extremities 42 of the draft yoke 43. This yoke is composed of two members having parallel forwardly located engaging parts 44 whose forward extremities are apertured to receive a link 45 with which a clevis 46 may be connected. In the rear of the parts 44 these yoke members are bent outwardly as shown at 47, and then extend rearwardly as shown at 48, the parts 48 being parallel and merging into the downwardly extending parts 42. The lower ends of these parts 42 are pivotally connected with inwardly bent and downwardly extending clips 49, their lower extremities 50 being rigidly connected with the forward portions of the bars 18 by suitable fastening devices 51. As shown in the drawing, the pivotal connection between the parts 42 and 49 is formed by means of bolts 55. It is evident that any suitable connecting device may be employed for this purpose, the only requisite being that the said parts shall be pivotally connected. The outer portions of the parts 31 rest upon and are secured to the clips 49 by fastening devices 52.

The parts 44 of the draft yoke pass through an upwardly projecting loop 53 which is secured to the transverse frame bar 7 by bolts 54. This construction permits the forward part of the draft yoke considerable movement within the guide loop 53, which is necessary since when the puller plows are lifted through the instrumentality of the lever 34, the rock shaft 33, the crank arms 38, and the links 40, the draft yoke is also raised by virtue of the connections heretofore explained.

Respectively connected with the draft yoke bars 48 are depending rods 56, the attachment being made by bolts 57. To the lower extremities of these rods are connected rotary colters or cutting disks 58. These disks are located on opposite sides of the pullers and their function is to cut off a portion of the tops of the beets and thus facilitate the operation of the pulling devices.

The main frame work 5 of the machine is strengthened on opposite sides by brace-bars 59 whose forward extremities are connected with the frame members 6 by bolts 60 while their rear extremities are secured by means of bolts 61 to the axle sleeves 13, the bolts passing through flanges or collars 62 formed integral with said sleeves.

The forward part of the frame work of the machine is supported by caster wheels 63, journaled on stub axles 64 forming a part of vertically disposed shafts 65 which are journaled as shown at 66 in the parallel arms 67 of a U-shaped bracket 68 clamped to the front member 7 of the main frame by bolts 69 passed through the vertical body member of the bracket 68 and an opposing plate 70 which engages the frame member 7 on the opposite side from the said bracket part.

The upper portion of each caster wheel shaft 65 is angular in cross section as shown at 71. A rod 72 has an opening in its rear extremity which is fitted to the angular extremity of the shaft while its forward extremity is bolted as shown at 73 to a transverse forwardly located bar 74 whereby a loose or pivotal joint is formed. Located in the rear of the bar 74 is a parallel bar 75 in which the upper ends 76 of the caster wheel shafts above the angular portions are journaled. Cotter pins 77 are passed through these journaled extremities of the shaft above the bar 75.

Swiveled upon the bar 75 is a U-shaped casting 78 which is connected with the rear extremity of a tongue 79 by a bolt 80, the tongue passing between the upright parallel arms of the casting.

Swiveled upon the bar 74 is a similar casting 81 having upright arms 82 between which the tongue passes. The rear extremity of the tongue is pivotally connected with the casting 78. The arms 82 of the casting 81 are of such length that the tongue is allowed a limited degree of vertical movement, its upward travel being limited by a bolt 83 passed through the upper extremities of the arms 82.

As illustrated in the drawing, the mechanism is arranged to use three horses abreast for drawing the machine. The tongue would be between two of the horses while the third horse would be located just beyond the center of the machine. In other words the two horses on one side of the tongue would occupy positions on opposite sides of the row of beets or other vegetables. A three-horse doubletree (not shown) is connected to the clevis 46 when the machine is in use.

When the machine is in use the puller plows are adjusted to enter the ground to the required depth, through the medium of the lever 34. As the machine is drawn across the field these plows enter the ground on opposite sides of the row of beets and pull the beets successively, the latter passing over the fingers 23 and dropping down upon the ground leaving a row of pulled beets in the rear of the machine. At the end of each row the puller plows are lifted entirely from the ground by use of the lever 34. Then as the team is turned the tongue 79 acting through the rods 72, turns the caster wheels in their bearings.

It will be understood that during the turning operation the parallelism of the rods 72 and the bars 74 and 75 is maintained though the angles formed by the rods and bars are changed.

Under some circumstances it becomes necessary to adjust the puller plows 25 whereby the space between them is made to vary. A considerable degree of adjustment in this regard is permissible by virtue of the peculiar connection between the upper portions of the bars 18. This connection is formed by a yoke 84 composed of a transverse member 85 having depending arms 86 whose lower extremities are respectively bolted to the bars 18 as shown at 87. The depending arms 86 of the yoke are connected intermediate their extremities by a rod 88 having opposite threaded extremities 89 to which are applied nuts 90. By properly adjusting these nuts the bars 18 may be caused to approach each other by virtue of the yielding capacity of the said arms. Again, when these nuts are loosened, there will be a tendency for the arms 86 to spring apart or assume their normal position, which may be considered when they are at right angles to the transverse member 85.

Mounted upon the axle 8 and projecting upwardly and rearwardly therefrom is a U-shaped support 91 for a seat 92, since it is assumed that the person in charge of the machine rides thereon.

The bolt 20 is secured by a nut 4. The bars 18 to which the metal straps 19 are secured are provided with slots 93 through which the bolts 20 pass. By virtue of these slots the metal straps and also the clip 21 may be adjusted upon the bars 18 as will be readily understood.

The two castings 78 and 81 are swiveled upon the parts 75 and 74, in the manner illustrated in Fig. 5 which shows the casting 81 only. In this case the last named casting is swiveled upon a bolt 3 which is secured to its bar 74 by a nut 2, the casting being free to turn on the bolt.

Having thus described my invention what I claim is:

1. A vegetable puller comprising a main frame work, a puller frame journaled thereon, and a draft yoke loosely connected with the forward portion of the main frame and having rearwardly extending, spaced arms, pivotally connected with the forward portion of the pulled frame, substantially as described.

2. The combination with a main frame, an axle and ground wheels, a vegetable puller frame pivotally mounted on the axle, a draft appliance loosely connected with the foward portion of the main frame and having rearwardly and downwardly extending, spaced arms, pivotally connected with the forward portion of the puller frame, and means connected with the said draft appliance for raising and lowering its arms, whereby the puller frame may be raised and lowered as desired, substantially as described.

3. A vegetable puller comprising a main framework, a puller frame pivotally mounted thereon, and a draft appliance loosely connected with the forward portion of the main frame and having rearwardly extending, spaced arms, pivotally connected with the forward portion of the puller frame, cutting disks carried by each of the said arms forwardly of the puller frame, and means connected with the draft appliance for vertically adju ng the puller frame, substantially as described.

4. A vegetable puller comprising a main frame work, a puller frame pivotally connected thereon, a draft appliance loosely connected with the forward portion of the main frame and having rearwardly extending, spaced arms, pivotally connected with the forward portion of the puller frame, cutter disks carried by each of the said arms forward of the puller frame, and means connected with the draft appliance for vertically adjusting the puller frame, substantially as described.

In testimony whereof I affix my signature in presence of two witnesses.

SQUIRE R. GIDDINGS.

Witnesses:
J. D. CAREY,
E. W. THAYER.